United States Patent

[11] 3,599,210

| | | |
|---|---|---|
| [72] | Inventor | Maxwell Stander<br>Silver Springs, Md. |
| [21] | Appl. No. | 877,722 |
| [22] | Filed | Nov. 18, 1969 |
| [45] | Patented | Aug. 10, 1971 |
| [73] | Assignee | The United States of America as represented by the Secretary of the Navy |

[54] RADAR ABSORPTIVE COATING
4 Claims, 1 Drawing Fig.

[52] U.S. Cl. ............................................. 343/18 A
[51] Int. Cl. .............................................. H01q 17/00
[50] Field of Search ................................ 343/18 A, 18 E

[56] References Cited
UNITED STATES PATENTS

| | | | |
|---|---|---|---|
| 2,752,594 | 6/1956 | Link et al. | 343/18 B |
| 2,841,786 | 7/1958 | Dicke | 343/18 A |
| 3,007,160 | 10/1961 | Halpern | 343/18 A |

Primary Examiner—Malcolm F. Hubler
Attorneys—Edgar J. Brower and Thomas O. Watson, Jr.

ABSTRACT: A radar absorptive coating for immunizing conductive surfaces to radar detection comprising conductive fibers cut to a length of one-half wavelength of the anticipated radar frequency and insulated along their lengths. The fibers are randomly distributed in a lossy dielectric resinous binder material bonded to an aircraft or missile. When radar signals impinge on the coating, the fibers act as tuned resonating dipoles for the radar frequency used, and the electromagnetic energy will be dissipated in the lossy material, preventing detection of the conductive surface by the radar.

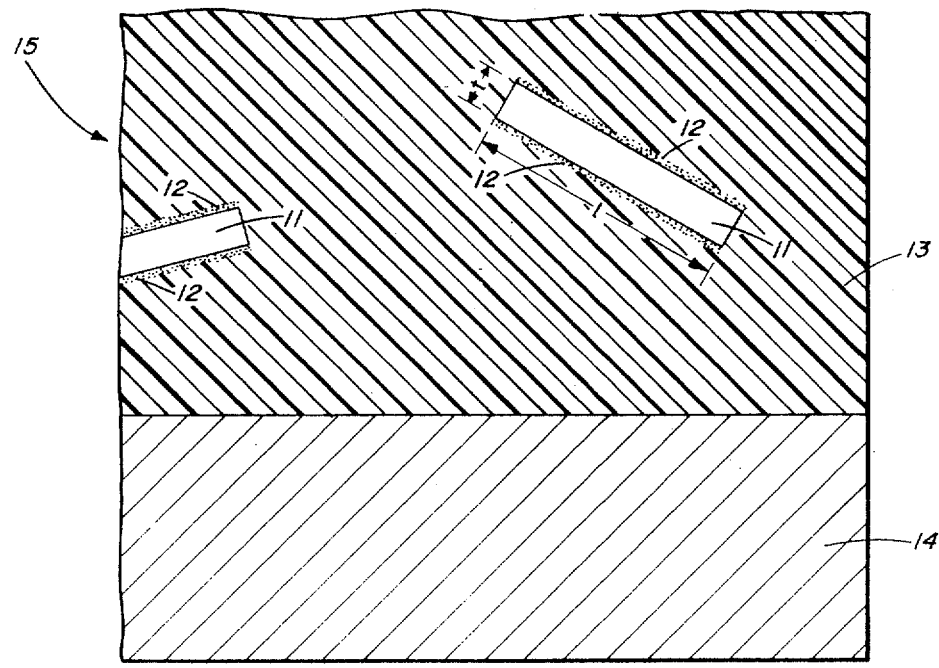

RADAR ABSORPTIVE COATING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a means for minimizing the reflection or radio microwave radiation of certain wavelength incident upon surfaces and objects which normally reflect such microwaves.

2. Description of the Prior Art

Many means exist today in the art of protecting good reflectors, such as electrically conductive surfaces, from incident radio microwaves of high the One such method consists of affixing a high loss dielectric material layer to the surface to be protected. Dispersed within the dielectric are conductive flakes of one half wavelength of certain radio frequencies to cause the layer to have a high loss and further attenuate the radio signal. The reason for this phenomenon is that the flakes would resonate at the radar frequencies and cause energy dissipation in the dielectric material. Although such methods have served their purpose, serious difficulties have been encountered since the flakes would not resonate along their whole lengths but would rather "short circuit", the current flowing from the end of the flake and terminating somewhere in the middle of the flake. This would cause some reflection of the radar signal and detection of the conductive surface. Furthermore, the method of making these flakes has proved both cumbersome and expensive.

SUMMARY OF THE INVENTION

The general purpose of this invention is to provide a radar absorptive coating for aircraft, ballistic missiles or other reflecting surfaces that will render them invisible to search radar. A coating of conductive fibers, each cut approximately $\lambda/2$ (one half wavelength) for a radar frequency, dispersed in a solid matrix of resinous material modified to have a high dielectric loss, is placed on the surface desired to be protected. Each conductive fiber would be completely insulated along its length with a high dielectric coating except that the ends would be bare. Every fiber in the coating acts as a tuned circuit for the radar frequency, in which the energy induced in the conductive fiber by the incident radar wave would be dissipated in the lossy matrix material and consequently not reach the metallic surface and be reflected back to the enemy radar.

OBJECTS OF THE INVENTION

It is therefore an object of the present invention to provide a coating for absorbing electromagnetic energy.

Another object of the present invention is to provide a novel coating for reflecting surfaces so as to make the surfaces relatively immune to detection by radar frequencies.

It is a further object of the present invention to provide a radar absorbing coating that is easy to apply to conductive surfaces.

A still further object of the present invention is to provide a radar absorbing coating that is simple to create and maintain.

Other objects, advantages and novel features of the invention will become apparent from the following detailed description of the invention when considered in conjunction with the accompanying drawing.

BRIEF DESCRIPTION OF THE DRAWING

The single FIGURE of the drawing illustrates the radar absorptive coating contemplated by the invention.

DESCRIPTION OF THE PREFERRED EMBODIMENT

Referring to the FIGURE, there is shown a section through a portion of a conductive surface provided with a coating for absorbing incident radio microwave radiation constructed in accordance with the principles of the invention. A conductive surface 14 is covered with a composite layer, designated generally by the reference numeral 15, formed of electrically conductive fibers 11 dispersed in a nonconductive binder 13. The conductive fibers 11 are preferably aluminum, although other conductors such as copper, iron, steel, titanium, Permalloy or graphite may be used, and are cut to a length of $\lambda/2$, i.e., one half the wavelength of the radar frequency being operated by the detecting radar. The wavelength of the radar is calculated from the formula: $\lambda f = c$ where $f$ is the radar frequency and $c$ is the velocity of light. Typical radar wavelengths are 5 centimeters and a typical width $t$ of each fiber being 10 microns. Prior to cutting the fibers 11 to the desired lengths, the fibers are insulated along their lengths by thinly bonding a high dielectric, low loss material 12, such as unfilled epoxy, pure resin or varnish. The fibers 11 are then randomly dispersed within the solid matrix of resinous material 13 loaded with a filler material such as ceramic, clay or graphite such that the material 13 has a high loss tangent and is capable of absorbing a high amount of electromagnetic energy. For maximum efficiency, the total thickness of coating 15 applied to surface 14 would preferably be an odd multiple of the quarter wave length of the incident radiation for which the composite layer is designed to be resonant, although it need not be necessarily so. Composite coating 15 would then be applied to surface 14 either by spraying, rolling, working or brushing the desired coating on the surface, where it quickly dries, or cures or by bonding a premolded sheet to conductive surface 14.

OPERATION OF THE INVENTION

In order that a better understanding of the invention may be had, its mode of operation will now be described. Whenever a radar signal having a wavelength twice the length of the fiber strikes the coating, it will cause the fibers 11 within the binder 13 to resonate and act as tuned dipoles at that frequency. The current induced in the dipole fiber 11 will form a circuit from one end of the fiber to the other end of the fiber through the binder 13. The insulation 12 along the edge of the fiber 11 will prevent any termination of the current anywhere but the other end of the fiber 11, ensuring that the fiber will resonate at the desired frequency and not "short circuit." The current flowing through binder 13 will be absorbed by the binder because it had been previously loaded with material to cause the highest electromagnetic loss possible. In this manner, the radar signal energy induced in the conductive fiber by the radar wave would be dissipated in the lossy matrix material 13 and consequently not reach the metallic structure 14 and be reflected back to the enemy radar.

In conclusion, it is believed that it has been made clear that the present invention possesses numerous advantages not found in the prior art. The coating configuration of the present invention ensures high absorptive efficiency because each wire fiber is a tuned dipole and a good conductor. Randomly dispersed wires can touch each other without loss of efficiency because each wire has an insulating coating.

Obviously many modifications and variations of the present invention are possible in the light of the above teachings.

What I claim is:

1. A coating for use on reflecting surfaces such that the surfaces becomes nonreflective to radar frequencies comprising:
   a high loss dielectric; and
   a plurality of conductive fibers dispersed within said dielectric;
   said fibers being insulated along their lengths, and bare at their ends.

2. A coating as defined in claim 1, wherein said fibers have a length of one half the wavelength of the radar frequency operated, whereby said fibers resonate at the radar frequency.

3. A coating as defined in claim 2 wherein said dielectric is loaded with lossy material whereby the coating absorbs maximum energy.

4. A coating as described in claim 3 wherein said conductive fibers comprise aluminum, said lossy dielectric material comprises filled epoxy, and said fibers are insulated with unfilled epoxy.